United States Patent
Arneson et al.

(10) Patent No.: US 7,129,854 B2
(45) Date of Patent: Oct. 31, 2006

(54) ELECTRONIC DEVICE WITH FORCE SENSING KEY

(75) Inventors: Theodore R. Arneson, Ivanhoe, IL (US); Michael L. Charlier, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 168 days.

(21) Appl. No.: 10/775,987

(22) Filed: Feb. 10, 2004

(65) Prior Publication Data

US 2005/0174260 A1  Aug. 11, 2005

(51) Int. Cl.
 *H04B 1/10* (2006.01)
 *H04B 7/00* (2006.01)
 *H04M 1/66* (2006.01)

(52) U.S. Cl. ............... 340/825.69; 340/825.79; 455/66.1; 455/310; 455/410

(58) Field of Classification Search ......... 340/825.69, 340/825.79; 455/66.1, 410, 310
See application file for complete search history.

(56) References Cited

U.S. PATENT DOCUMENTS

| | | | |
|---|---|---|---|
| 3,668,337 A | | 6/1972 | Sinclair |
| 5,184,120 A | * | 2/1993 | Schultz ............... 340/870.38 |
| 5,231,386 A | | 7/1993 | Brandenburg et al. |
| 5,241,308 A | * | 8/1993 | Young ............... 341/34 |
| 5,528,235 A | | 6/1996 | Lin et al. |
| 5,541,622 A | * | 7/1996 | Engle et al. ............... 345/161 |
| 5,659,334 A | * | 8/1997 | Yaniger et al. ............... 345/156 |
| 5,701,142 A | * | 12/1997 | Brown et al. ............... 345/168 |
| 5,973,621 A | | 10/1999 | Levy |
| 5,995,026 A | * | 11/1999 | Sellers ............... 341/34 |
| 6,377,685 B1 | | 4/2002 | Krishnan |
| 6,441,753 B1 | * | 8/2002 | Montgomery ............... 341/34 |
| 2003/0098853 A1 | | 5/2003 | Ladouceur et al. |

FOREIGN PATENT DOCUMENTS

| | | |
|---|---|---|
| WO | WO 01/95358 A2 | 12/2001 |
| WO | WO 03/012617 A2 | 2/2003 |

OTHER PUBLICATIONS

Gary P. Scavone; Variable Resistors; May 1, 2001; http://ccrma-www.standford.edu/~gary/controllers/resistors.html.

* cited by examiner

*Primary Examiner*—Jeffery Hofsass
*Assistant Examiner*—Kimberly Jenkins
(74) *Attorney, Agent, or Firm*—Lawrence J. Chapa; Sylvia Chen (57) ABSTRACT

An electronic device with a force sensing key (200) has a switch (280), a first force sensing region (290) for acquiring a first force value, a second force sensing region (290) for acquiring a second force value, and a processor for determining a selected function for the key (200) based upon the first force value and the second force value when the switch (280) is activated. The first force sensing pad (290) and the second force sensing pad (290) use a partially resistive material (250) that exhibits a force-to-voltage response value. By forming the switch (280) as a dome (225) switch, the force sensing key (200) provides crisp tactile feedback to a user. The force sensing key (200) can be configured for a variety of applications and user preferences by varying the architecture of the actuator (270).

36 Claims, 7 Drawing Sheets

FIG. 7

ELECTRONIC DEVICE WITH FORCE SENSING KEY

FIELD OF THE DISCLOSURE

This disclosure relates generally to compact keypads for devices such as fixed telephones, mobile telephones, personal digital assistants (PDAs), and remote controllers.

BACKGROUND OF THE DISCLOSURE

A compact keypad for a telephone, PDA, remote controller, or similar device typically has between twelve and twenty keys for controlling the operation of the device. The keys generally include: number keys "0"–"9"; telephony keys "*" and "#"; and keys for additional functions such as "menu", "cancel", "cursor up", "cursor down," "cursor right," "cursor left," and "select". In at least some instances, the device's size impacts the number of keys that can be conveniently accessed.

In order to increase the number of functions available through a device (or maintain a constant number of functions in light of decreasing device size), often several keys in the compact keypad are associated with multiple functions and/or meanings in order to enable the increased number of features and functions of the device. Commonly, the compact keypad functions as an alphanumeric keypad for features such as messaging and phonebook, where both letters and numbers are entered from the keypad.

Various approaches have been used to associate a single key with multiple alphanumeric characters. In one type of approach, a single key is associated with a single switch, and at least one key press (but usually more than one keypress) is required for the user to obtain the desired character. For example, a user presses a single key multiple times to cycle through alphanumeric choices until a pause (or pressing of another key) by the user indicates a selection of the currently presented character.

In a second type of approach, more than one switch is associated with a single key. Sometimes these multi-switch keys are referred to as "cluster" keys or "combination" keys. Near-simultaneous activation of one or more switches associated with the multi-switch key indicates which alphanumeric character is desired. This second type of approach is less cumbersome for alphanumeric character entry, because a user can manipulate a single key to access multiple characters directly. A user, however, is also more prone to make entry errors because the depression of the key must be precise enough to access only the desired switches and also because the tactile feedback for a multi-switch key is unfamiliar. For example, most users release a key after a single popple dome of a switch has been depressed, which is sometimes before the correct combination of popple dome switches has been activated to obtain the desired result in a multi-switch key. This user habit results in a need for changing the incorrect character entered and may eventually result in user frustration.

Thus, there is a desire for a compact keypad that facilitates direct alphanumeric character entry and entry of other functions. It is desirable that the compact keypad does not have an unusual tactile sensation. The various aspects, features and advantages of the disclosure will become more fully apparent to those having ordinary skill in the art upon careful consideration of the following Drawings and accompanying Detailed Description.

DETAILED DESCRIPTION OF THE EMBODIMENTS

An electronic device with a force sensing key has a switch, a first force sensing region for acquiring a first force value, a second force sensing region for acquiring a second force value, and a processor for determining a selected function for the key based upon the first force value and the second force value when the switch is activated. The first force sensing region and the second force sensing region use a partially resistive material that exhibits a force-to-voltage response value. Additional force sensing regions, and additional functions, can be included in the electronic device. The processor adapts to key press corrections to determine a user's intended function selection. By forming the switch as a dome switch, the force sensing key provides crisp tactile feedback to a user. The force sensing key can be configured for a variety of applications and user preferences depending on the actuator topology for the force sensing key and the material(s) used to form the actuator.

Figure 1:
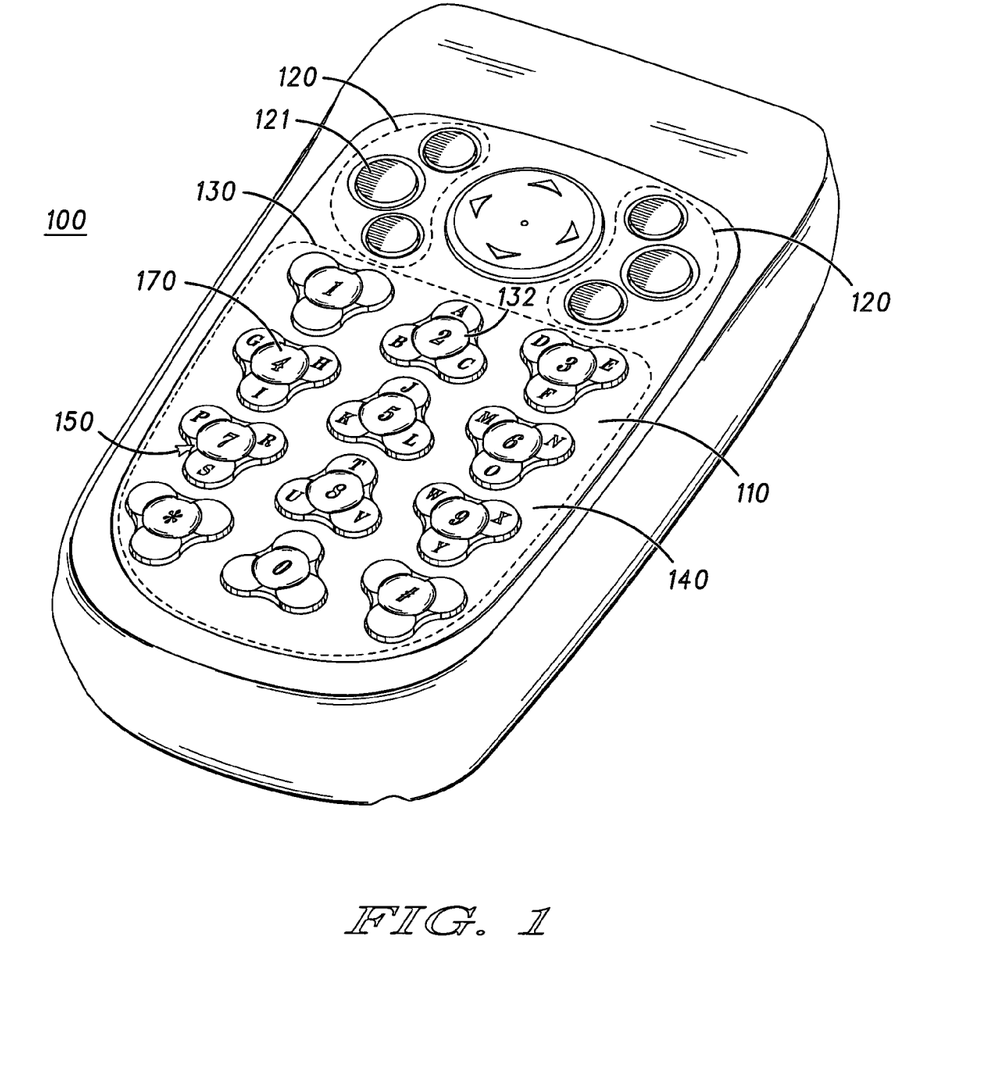
FIG. 1 shows an electronic device with a keypad according to an embodiment.

FIG. 1 shows an electronic device 100 with a keypad 110 according to an embodiment. In the particular embodiment illustrated, electronic device 100 is a wireless communication device such as a mobile telephone, but the keypad 110 can easily be applied to fixed telephones, personal digital assistants (PDAs), remote controllers, laptop computers, and other keyed electronic devices. The keypad 110 has a plurality of keys 120, 130. Six of the keys 120 are conventional keys. Twelve keys are force sensing keys 130, which will be described in detail in conjunction with FIGS. 2–5.

In this embodiment, each force sensing key 130 is generally triangular in shape with a large central region and three satellite regions. A standard telephony keypad associates up to three letters with a single telephony number 0, 1, 2, 3, 4, 5, 6, 7, 8, 9, *, and #. Thus, a specific key, such as key 132, has a primary function of entering the number 2 and three secondary functions of entering a letter A, B, or C. Each of the three satellite regions is associated with one of the three secondary functions of entering a unique character. Using this distribution of one numeral for each primary function and one letter for each of three secondary functions, a standard alphanumeric character set can be distributed throughout the twelve keys of a standard telephony keypad.

The keypad 110 also has a cover 140 with a plurality of openings 150 through which at least some actuators 121, 170 of the keys 120, 130 are exposed. The exposed contact surfaces are adapted to receive an externally applied force and transfer the force to a central switch and a plurality of satellite force sensing pads underneath the actuators 121, 170.

The electronic device 100 includes a processor for interpreting user input, such as key presses, and providing user output, such as visual displays, audible alerts, or control signals. The processor also interprets the key presses to determine which function has been activated by a particular key press. Depending on the forces sensed by the satellite force sensing pads of a key, the processor determines if a primary function or one of several possible secondary functions was intended by the key press.

Different keys and key configurations can be used to enable different primary and secondary functions, depending on the particular application of the electronic device. For example, a key may be oval in shape and have two satellite regions or a key may be square or diamond in shape and have four satellite regions. With slightly different configurations, different character sets, such as those from non-Romanized languages, can be implemented on a keypad similar to the one shown in FIG. 1.

Figure 2:
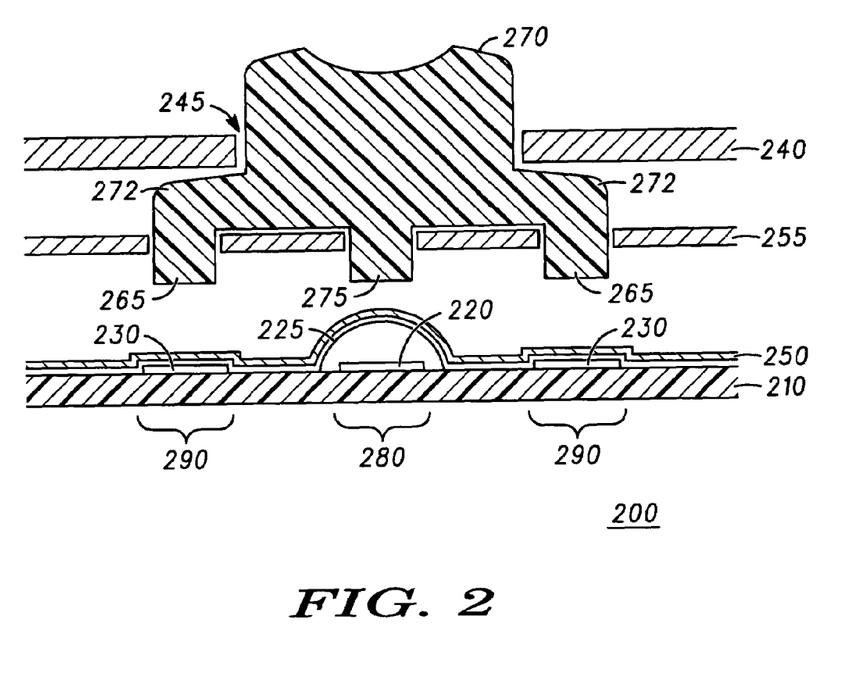
FIG. 2 shows a cross-section of a force sensing key in the electronic device of FIG. 1 according to a first embodiment.

FIG. 2 shows a cross-section of a force sensing key 200 in the electronic device 100 of FIG. 1 according to a first embodiment. Force sensing keys, such as keys 130 in FIG. 1, use a force sensing material to gauge how much pressure is being applied to multiple force sensing pads 290 of the key 200. The force measurement is evaluated when a central switch 280 closes due to external pressure on an actuator 270.

The various components of the force sensing key 200 are supported on a common substrate 210, such as printed circuit board material. Alternate constructions include printed circuitry on a flexible substrate supported by metal, plastic, or other rigid base. In at least one embodiment, the common substrate 210 is generally planar.

A central switch 280 is formed using a switch contact 220 on a surface of the common substrate 210. Interleaving conductive traces usually form central switch contact 220 topographies, so that a conductive popple dome 225 pressed against the conductive traces closes the switch. The dome 225 helps protect against inadvertent key presses and also provides tactile feedback when a key press has activated the central switch 280.

Satellite force sensing pads 290 around the central switch 280 include satellite force contacts 230 formed from interleaving conductive traces. A layer of partially resistive material 250 is applied over the satellite force contacts 230 using a spacer adhesive. When a force is applied to the partially resistive material 250 to compress it against the contacts 230, a better electrical path is made between the interleaving conductive traces of the satellite force contacts 230. This produces a voltage value that increases as force is applied to the resistive material 250, which is evaluated when the central switch 280 closes. Other materials can be used to form the satellite force sensing pads 290, such as a partially capacitive material applied over interleaving conductive traces, a pressure or movement sensor, a light sensor, or a strain gauge. The force sensing pads 290 can also be implemented in the form of readily available force sensing polymer thick film devices.

In at least one embodiment, the key 200 has a hard plastic actuator 270 that provides a top contact surface with a solid feel to a user, and the hard plastic helps distribute the force of a key press to the central switch 280 and the satellite force sensing pads 290 on a bottom contact surface. The hard plastic actuator 270 also provides for a clean snap of the popple dome to provide tactile feedback to a user. The actuator 270 is supported on a pad 255 that aligns and supports the multiple actuators in the keypad 110 shown in FIG. 1. The pad 255 is made of a soft elastomeric material such as silicon. The actuator 270 is formed to create a central plunger 275 positioned above the dome 225 and the central switch contacts 220. Thus, downward pressure on the top contact surface of the actuator 270 causes the central plunger 275 on the bottom contact surface to depress the dome 225 against the central switch contacts 220 and closes the central switch 280.

The bottom contact surface of the actuator 270 includes satellite plungers 265 positioned above the satellite force sensing pads 290. Thus, oblique pressure on a top contact surface of the actuator 270 creates a force against the satellite force contacts 230, which can be measured.

The actuator 270 includes a flange 272 formed on the perimeter to situate the actuator 270 in an opening 245 in the cover 240 and over the popple dome 225 and satellite force contacts 230. The flange 272 is configured to extend at least partially beyond the size and shape of an opening in the cover 240. When the actuator 270 is positioned properly in the electronic device 100 shown in FIG. 1, a portion of the actuator 270 is exposed through an opening in the cover 240, and the flange 272 is located behind the cover 240. Then, an off-center force on the actuator 270 causes force on the nearest satellite plunger 265. Thus, when the central switch 280 closes, there is a significant force value on the selected satellite force sensing pad 290.

As one way to provide sensitive satellite force sensing pads 290, the satellite plungers 265 are located under the cover 240 and are designed to cause pressure on a large portion of the satellite force contacts 230. Switch contact topographies and areas of the satellite plungers 265 that contact with the satellite force contacts 230 can be designed to maximize the sensitivity of the satellite force sensing pads 290. Increasing the distance between the central plunger and the satellite plungers also increases the sensitivity of the satellite force sensing pads.

Figure 3:
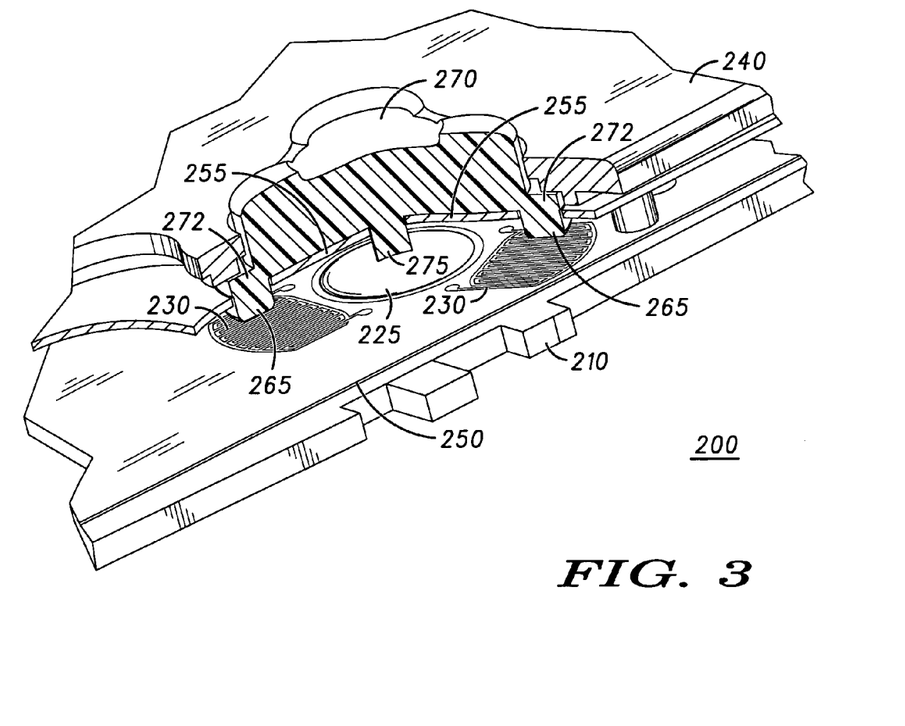
FIG. 3 shows a partial cut-away of the force sensing key in FIG. 2.

FIG. 3 shows a partial perspective cross-section of the force sensing key 200 shown in the FIG. 2. A hard plastic actuator 270 has a central plunger 275 and at least one satellite plunger 265. The actuator 270 includes a flange 272 as described previously with reference to FIG. 2.

The central switch includes a conductive popple dome 225 positioned over the central switch contacts (shown in FIG. 2). The popple dome 225 has a triangular shape raised high off the substrate 210 that provides tactile feedback due to a large dome travel distance during activation. This type of popple dome also provides a large target area ("sweet spot") for the central plunger 275. Because oblique pressure is expected on the actuator 270, a large target area is advantageous to accommodate different keypress styles. Alternate dome shapes include round, round with an inverted dimple, four-legged, and oblong.

The satellite plungers 265 are positioned above satellite force contacts 230. A layer of partially resistive material 250 is between the satellite plungers 265 and the satellite force contacts 230. As described before, oblique pressure on the actuator 270 causes at least one satellite plunger 265 to exert pressure on the associated portion of partially resistive material 250 and satellite force contact 230. Downward pressure causes the popple dome 225 to collapse and close the central switch 280. When the central switch closes, a force measurement on each of the satellite force contacts 230 is measured to determine an intended character.

Force sensing keys can have different architectures depending on their intended application. Different actuator materials affect the tactile feedback of a force sensing key. Different plunger placements affect the sensitivity of the central switch and satellite force sensing pads.

Figure 4:
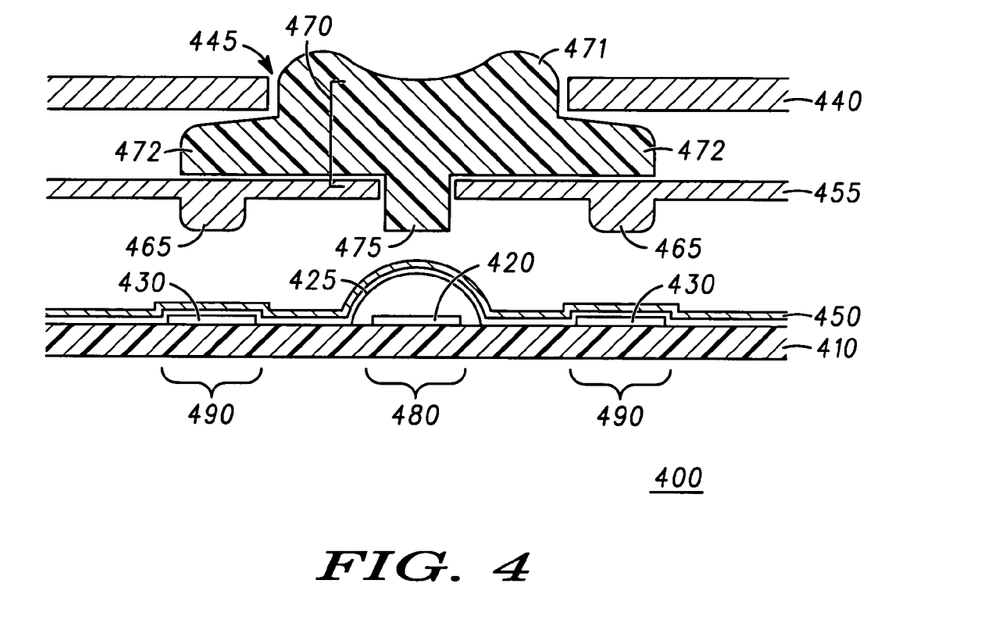
FIG. 4 shows a cross-section of a force sensing key in the electronic device of FIG. 1 according to a second embodiment.

FIG. 4 shows a cross-section of a force sensing key 400 in the electronic device 100 of FIG. 1 according to a second embodiment. A force sensing key, such as keys 130 in FIG. 1, uses a force sensing material to gauge how much pressure is being applied to multiple force sensing pads 490 of the key 400. The force measurement is evaluated when a central switch 480 closes due to external pressure on an actuator 470.

The actuator 470 has a key cap 471 formed from a hard plastic material and includes a flange 472 and a central plunger 475. A hard plastic key cap 471 has a top contact surface that provides a solid feel to a user, and the hard plastic helps distribute the force of a keypress to the central switch 480 and the satellite force sensing pads 490. The key cap 471 is attached to a pad 455 which forms the underside of the composite actuator 470. The pad 455 is formed from a soft material such as silicon. The pad 455 aligns and supports the key cap 471 and also provides a bottom contact surface to the actuator 470 with satellite plungers 465 that are soft and deformable. A portion of the key cap 471 emerges through an opening 445 in the cover 440 while the flange 472 and central plunger 475 are underneath the cover 440.

As described previously, downward pressure on the top contact surface of the actuator 470 causes the central plunger 475 on the bottom contact surface of the actuator 470 to depress a popple dome 425 and close central switch contacts 420. Oblique pressure on the top contact surface of the actuator 470 causes at least one satellite plunger 465 on the bottom contact surface of the actuator 470 to make more contact with the satellite force contacts 430. As more pressure is applied to a satellite plunger 465, the satellite plunger 465 warps to provide a larger pressure area against the partially resistive material 450 and the satellite force contacts 430. This helps produce a voltage reading from the satellite force sensing pad 490 that varies with the applied force.

The flange 472 formed on the perimeter of the key cap 471 situates the actuator 470 in the cover 440 and over the popple dome 425 and satellite force contacts 430. The flange 472 is configured to extend at least partially beyond the size and shape of an opening in the cover 440. When the actuator 470 is positioned properly in the electronic device, a portion of the key cap 471 is exposed through an opening in the cover 440, and the flange 472 is located behind the cover 440. Then, an off-center force on the actuator 470 causes force on the nearest satellite plunger 465. Thus, when the central switch 480 closes, there is a significant force value on the selected satellite force pad 490.

The tactile feedback is softer from a force sensing key according to this second embodiment. The soft pad 455 underside of the actuator 470 creates a softer response, which affects even the tactile feedback of the popple dome 425 through the central plunger 475 of the key cap 471.

The various components of the force sensing key 400 are supported on a common substrate 410, such as printed circuit board material. Alternate constructions include printed circuitry on a flexible substrate supported by metal, plastic, or other rigid base. In at least one embodiment, the common substrate 410 is generally planar.

The central switch 480 is formed using a conductive popple dome 425 and a switch contact 420 on a surface of the common substrate 410, so that a predetermined amount of external force applied to popple dome 425 collapses the dome onto the central switch contact 420 and closes the switch. Interleaving conductive traces usually form central switch contact 420 topographies. The dome 425 helps protect against inadvertent key presses and also provides tactile feedback when a key press has activated the central switch 480.

Satellite force sensing pads 490 in satellite force sensing regions around the central switch 480 include satellite force contacts 430 formed from interleaving conductive traces. A layer of partially resistive material 450 is applied over the satellite force contacts 430 using a spacer adhesive. When a force is applied to the partially resistive material 450 to compress it against the contacts 430, an electrical path is made between the interleaving conductive traces of the satellite force contacts 430; a greater force creates a better electrical path. This produces a voltage value that increases as force is applied to the resistive material 450, which is evaluated when the central switch 480 closes. Other materials can be used to form the satellite force sensing pads 490, such as a partially capacitive material applied over interleaving conductive traces, a pressure or movement sensor, a light sensor, or a strain gauge. The force sensing pads 490 can also be implemented in the form of readily available force sensing polymer thick film devices.

Figure 5:
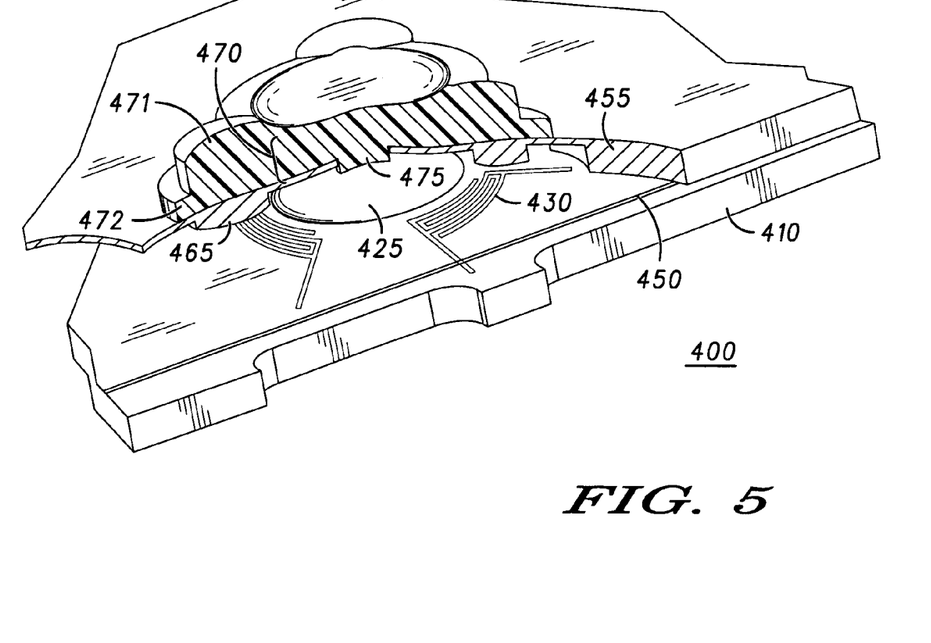
FIG. 5 shows a partial cut-away of the force sensing key in FIG. 4.

FIG. 5 shows a partial cross-section of the force sensing key 400 shown in FIG. 4. The actuator 470 is formed from a hard plastic key cap 471 and a portion of a soft pad 455. The key cap 471 includes a flange 472 and a central plunger 475. The soft pad 455 forms the underside of the actuator 470 and includes satellite plungers 465. Note that the satellite plungers 465 in this second embodiment are closer to the central plunger 475 than in the first embodiment. This demonstrates that the relative positions of the satellite plungers and central plungers may be varied in particular embodiments.

The popple dome 425 has a triangular shape raised high off the substrate 410 that provides tactile feedback due to a large dome travel distance during actuation. This type of popple dome also provides a large target area ("sweet spot") for the central plunger 475. Because oblique pressure is expected on the actuator 470, a large target area is advantageous to accommodate different keypress styles. Alternate dome shapes include round, round with an inverted dimple, four-legged, and oblong.

When an oblique force is applied to the actuator 470, the portion of the soft pad 455 forming the satellite plungers 465 under the oblique force presses the partially resistive material 450 against the satellite force contacts 430. The key cap 471 includes a flange 472 configured to extend at least partially beyond the size and shape of an opening in the cover 440 shown in FIG. 4.

When the actuator 470 is positioned properly in the electronic device, a portion of the key cap 471 is exposed through an opening in the cover 440 shown in FIG. 4 and the flange 472 is located behind the cover. Then, an off-center force on at least one of the satellite force sensing pads 490 exerts force on the soft pad satellite plunger 465. Thus, when the central switch closes, there is a significant force value on the selected satellite force pad.

As one way to provide sensitive satellite force sensing pads 490, the pad 455 is formed of a soft elastomeric material under a harder key cap 471. The pad 455 includes satellite plungers 465 aligned with the satellite force contacts 430. Thus, as more pressure is applied to a satellite plunger 465 of the pad 455, the satellite plunger 465 warps to provide a larger pressure area against the partially resistive material 450 and the satellite force contacts 430. This helps produce a voltage reading from the satellite force sensing pad 590 that varies with the applied force.

The actuator 470 formed by the key cap 471 and a portion of the pad 455 allows for a soft tactile feedback to a user and a variable force footprint on satellite force sensing pads 490.

In these embodiments, only three analog-to-digital converters are required to obtain force values for the force sensing keys 130 shown in FIG. 1. The three analog-to-digital converters are coupled in parallel to each trio of satellite force contacts. The analog-to-digital converters are then coupled to a processor that is also coupled to the central switch contacts matrix.

Figure 6:
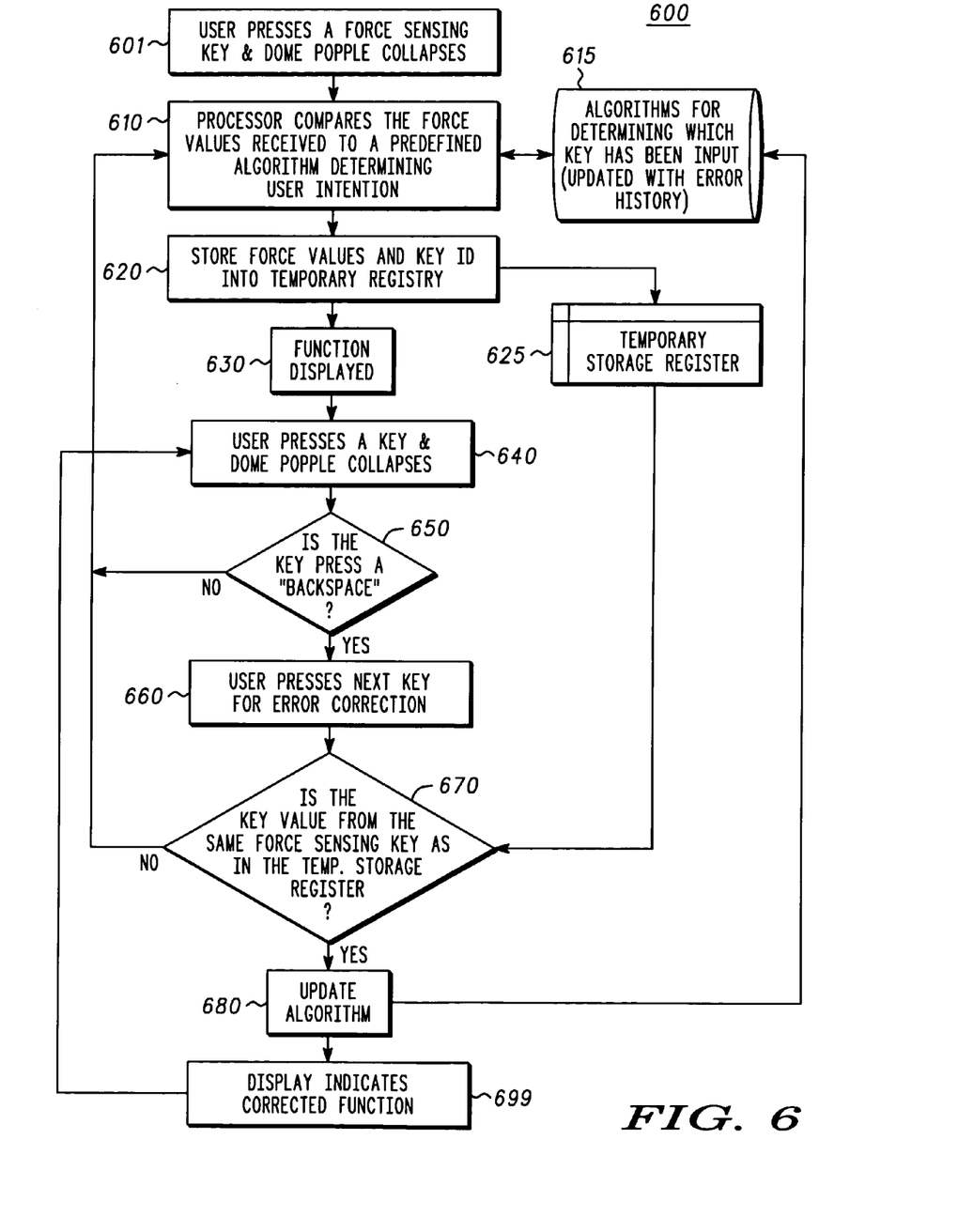
FIG. 6 shows a flow chart for operation of the force sensing keys shown in FIG. 2 and FIG. 4.

FIG. 6 shows a flow chart 600 for operation of the force sensing keys 200, 400 shown in FIGS. 2–5. A processor coupled to the central switch contact 220, 420 and satellite force sensing contacts 230, 430 of a force sensing key 200, 400 evaluates the force values of each of the associated satellite force sensing pads 290, 490 when the central switch 280, 480 is closed to determine the selected function for the key 200, 400.

In step 601, a user presses a key with enough force to collapse the dome 225, 425 and closes the central switch 280, 480 shown in FIGS. 2–5. In step 610, the processor obtains force values from the satellite force sensing pads and uses the force values to determine the user's intention. A variety of algorithms, stored in storage device 615, may be used to determine the user's intention. For example, the processor may use a relative force algorithm or an absolute force algorithm.

In a sample basic relative force algorithm, if the force values from each of the three satellite force sensing pads are roughly equivalent (for example, within 20% of each other), the processor determines that the user intended a primary function. If one force value is significantly greater (for example over 20%) than the other force values, then the processor determines that the user intended the secondary function associated with the greater-valued satellite force sensing pad.

In a sample basic absolute force algorithm, if the force values from each of the three satellite force sensing pads do not exceed a predetermined threshold, the processor determines that the user intended a primary function. If a force value exceeds the predetermined threshold, then the processor determines that the user intended the secondary function associated with the greatest-valued satellite force sensing pad.

Step 620 stores the force values associated with each satellite force sensing pad and a key identifier for the activated key into a temporary storage register 625 for later use.

Step 630 displays the function determined by the processor in step 610. For example, if the processor determines that the intended function was a primary function associated with force sensing key 132 in FIG. 1, the number 2 would be displayed.

Next, the user presses a next key with enough force to collapse a dome and close a central switch in step 640. Step 650 determines if the key press was a backspace or other error-correction key. The backspace key is a standard key and not a force sensing key; however, it is possible to implement the backspace key as a force sensing key. If the key press was not a backspace, the flow returns to step 610 to determine the intended key press. If the key press was a backspace, the flow awaits a further key press in step 660. If step 670 determines that the further key pressed is not the same force sensing key as the key pressed in step 601, which force values and key identifier are stored in the temporary storage register 625, the processor determines that the user initially pressed the wrong key and returns to step 610.

If step 670 determines that the further key pressed is the same force sensing key as the key pressed in step 601 as established using temporary storage register 625, in step 680 the processor updates the algorithm in storage device 615 to reflect the corrected function. For example, the user may have intended to enter a letter but pressed a key only slightly off center. The function displayed in step 630 would be the primary function, a number, associated with the depressed force sensing key. Upon correction of the primary function to the intended secondary function, the algorithm in the storage device 615 is updated to reduce the threshold for entry of the secondary function for that particular force sensing key. Conversely, if the user intended to enter a number but pressed a key slightly off center, the process of correcting the initial key press also increases a stored threshold value for primary function entry of that force sensing key. Also, if the user replaces a secondary function with another secondary function of the same force sensing key, the algorithm individually adjusts the threshold values for the satellite force sensing pads.

For the sample basic relative force algorithm, the algorithm is updated to adjust the stored threshold difference value between the satellite force sensing pads that determines if a primary function or a secondary function was intended. For the sample basic absolute force algorithm, the algorithm is updated to adjust the predetermined threshold that distinguishes between a primary function and a secondary function. More sophisticated algorithm updates can provide for different levels of oblique pressure on the satellite force sensing pads of individual force sensing keys, optimize for left-hand or right-hand key presses, and take into account any effect that aging of the key components may have.

Step 699 displays the corrected function and returns to step 640. If a further key press in step 640 is a backspace as determined in step 650, additional error correction occurs. Thus, the key pad adjusts the processor algorithm to account for user key press habits. Operation of the flow can be continuous or limited to certain learning periods, such as during initial user training or times when the primary operator of the electronic device is operating the device.

Figure 7:
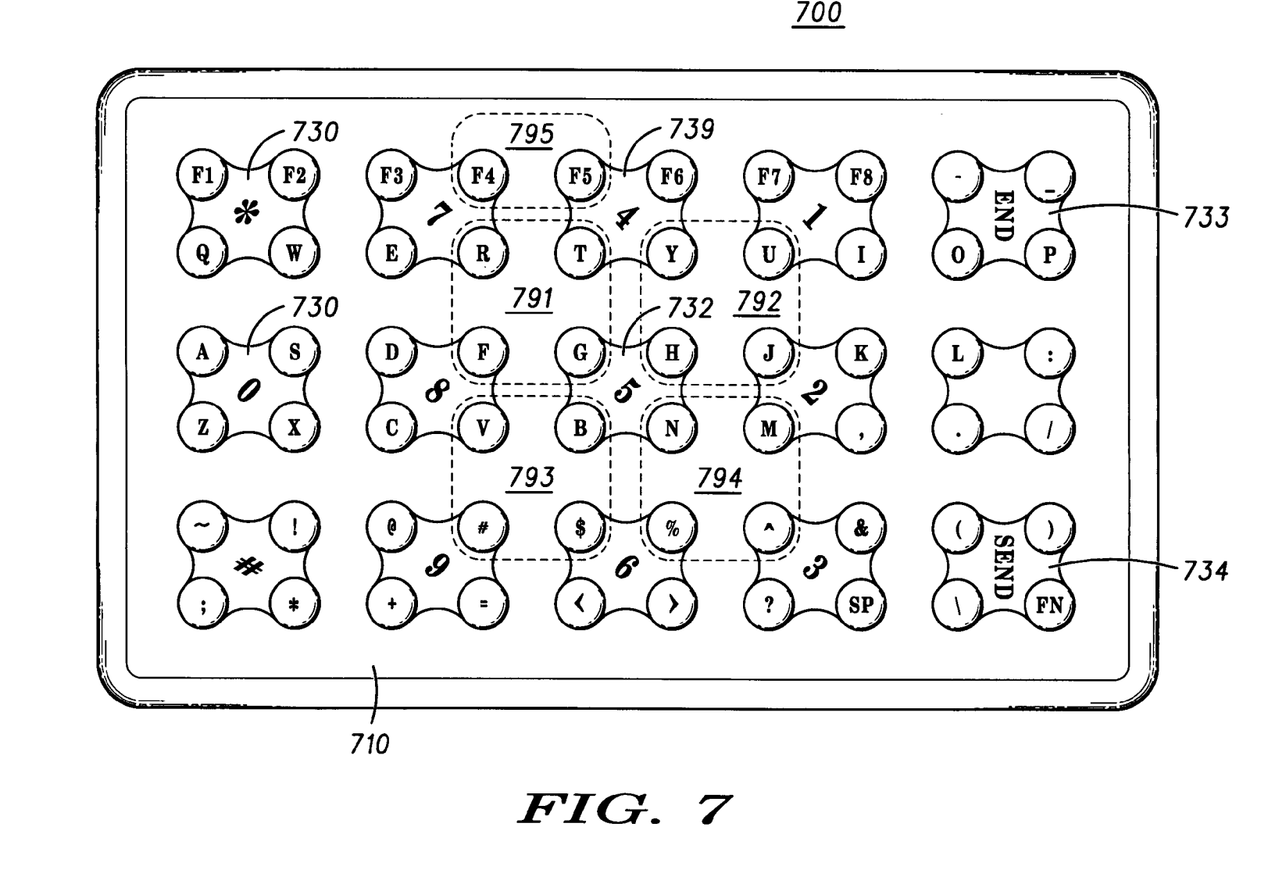
FIG. 7 shows an electronic device with a keypad according to an alternate embodiment.

FIG. 7 shows an electronic device 700 with a keypad 710 according to an alternate embodiment. The electronic device 100 shown in FIG. 1 had twelve force sensing keys based on a standard telephone keypad configuration, where the 2 key is also associated with the letters A, B, C. The electronic device 700 has fifteen force sensing keys 730 based on a QWERTY keyboard overlaid on a numerical keypad. In this alternate embodiment, a single force sensing key has up to one primary function (SEND, END, 1, 2, 3, 4, 5, 6, 7, 8, 9, 0, *, #) and four secondary functions.

For example, a force sensing key 732 has a primary function of entering the number 5 and four secondary functions of entering a letter G, H, B, or N. In this alternate embodiment, several of the force sensing keys 733, 734 have primary functions that are wireless communication functions and not character entry functions.

In order to reduce spacing between keys and yet have appropriate sensitivity to secondary function selections, a single satellite force sensing pad 791, 792, 793, 794 can be associated with more than one key. For example, satellite force sensing pad 791 is associated with the central switch of key 732 and secondary function of entering a letter G when the central switch for key 732 is activated. The same satellite force sensing pad 791 is associated with the secondary function of entering a letter T when the central switch for key 739 is activated. Similarly, satellite force sensing pads 792, 793, 794 each have four associated keys. Only two keys are associated with satellite force sensing pad 795.

Thus, the keypad for an electronic device has keys that allow direct alphanumeric character entry and direct entry of other functions, it has a familiar tactile sensation of a single popple dome under a single key, and it provides for a learning feature that adjusts the function determination algorithm to a user's key press habits.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope of the invention, which are to be limited not by the embodiments shown but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. An electronic device with a key comprising:
   a switch having a popple dome;
   a first force sensing region, for acquiring a first force value;
   a second force sensing region, for acquiring a second force value; and
   a processor, coupled to the switch, the first force sensing region, and the second force sensing region, for determining a selected function for the key based upon the first force value and the second force value when the switch is activated.

2. An electronic device according to claim 1, wherein the first force sensing region and the second force sensing region comprise:
   a partially resistive material, which exhibits a force-to-voltage response value.

3. An electronic device according to claim 1, further comprising:
   a third force sensing region, for acquiring a third force value upon activation of the switch,
   wherein the processor is also coupled to the third force sensing region and determines the selected function for the key based upon the first force value, the second force value, and the third force value when the switch is activated.

4. An electronic device according to claim 3, wherein the selected function is a primary function when the first force value, the second force value, and the third force value are all below a stored threshold value.

5. An electronic device according to claim 3, wherein the selected function is a secondary function when the first force value exceeds a stored threshold value.

6. An electronic device according to claim 5, wherein the selected function is a primary function of entering a character from a group having 0,1,2,3,4, 5,6,7,8,9,*, and #.

7. An electronic device according to claim 1 further comprising:
   an actuator positioned above the switch, for activating the switch upon receipt of at least a predetermined amount of pressure.

8. An electronic device according to claim 7, wherein the actuator comprises:
   a plunger positioned above the switch.

9. An electronic device according to claim 8, wherein the key a popple dome is positioned under the plunger.

10. An electronic device according to claim 7, wherein the actuator comprises:
    a first satellite plunger positioned above the first force sensing region; and
    a second satellite plunger positioned above the second force sensing region.

11. A keypad comprising:
    a first central switch;
    a second central scwitch;
    one or more satellite force sensing pads located around the first of central switch and the second central switch;
    first actuator for the first central switch, the first actuator having a first side adapted for receiving an externally applied force, and a plurality of contact surfaces on a second side, the plurality of contact surfaces on the second side corresponding to the first central switch and one or more associated satellite force sensing pads,wherein the first actuator has multiple actuations, each actuation being distinguishable by an evaluation of the forces sensed by the one or more associated satellite force sensing pads; and
    a second actuator for the second central switch, the second actuator having a first side adapted for receiving an externally applied and a plurality of contact surfaces on a second side, the plurality of contact surfaces on the second side corresponding to the second central switch and one or more associated satellite force sensing pads, wherein the second actuator has multiple actuations, each actuation being distinguishable by an evaluation of the forces sensed by the one or more associated satellite force sensing pads.

12. A keypad in accordance with claim 11 wherein at least one of the one or more satellite force sensing pads is associated with at least one of the first central switch and the second central switch.

13. A keypad in accordance with claim 11 wherein at least one of the one or more satellite force sensing pads is associated with more than one of the first central switch and the second central switch.

14. A keypad in accordance with claim 11 wherein each of the satellite force sensing pads is associated with a selection of a different character input.

15. A keypad in accordance with claim 11 wherein each of the multiple actuations is associated with a different character input.

16. A keypad in accordance with claim 11 wherein the first actuator is triangular in shape.

17. A keypad in accordance with claim 11 wherein the first actuator is quadrilateral in shape.

18. A keypad in accordance with claim 11 further comprising a processor coupled to the first central switch, the second central switch and the one or more satellite force sensing pads, wherein the processor is adapted for comparing the forces sensed by the satellite force sensing pads when one of the first central switch and the second central switch is activated and, based at least in part upon the comparison, distinguishing among the multiple actuations.

19. A keypad in accordance with claim 11 further comprising:
a cover having an opening through which at least some of the first side of the first actuator is exposed.

20. The keypad in accordance with claim 11 wherein the keypad is used as part of a wireless communication device.

21. A keypad in accordance with claim 20 wherein a secondary key press is detected when a one of the first central switch and the second central switch is activated and a maximum difference between the forces sensed by the one or more satellite force sensing pads located around the one of the first central switch and the second central switch is greater than a stored threshold value.

22. A keypad in accordance with claim 20 wherein a primary key press is detected when a one of the first central switch and the second central switch is activated and a maximum difference between forces sensed by the one or more satellite force sensing pads located around the one of the first central switch and the second central switch is less than a stored threshold value.

23. A keypad in accordance with claim 22 wherein a secondary key press is detected when a one of the first central switches and the second central switch is activated and a maximum difference between the forces sensed by the one or more satellite force sensing pads located around the one of the first central switch and the second central switch is greater than a stored threshold value.

24. A keypad in accordance with claim 23 wherein if after one of a primary key press and a secondary key press is detected, a user replaces the detected key press with the other one of the primary key press and the secondary key press, at least one stored threshold value is updated.

25. A keypad in accordance with claim 23 wherein, when a primary key press is replaced by a secondary key press, a processor is adapted to reduce at least one of the stored threshold values.

26. A keypad in accordance with claim 23 wherein, when a secondary key press is replaced by a primary key press, the processor is adapted to increase at least one of the stored threshold values.

27. A keypad in accordance with claim 20 wherein a secondary key press is detected based upon the associated satellite force sensing pad having the greatest force detected when one of the first central switch and the second central switch is activated.

28. The keypad in accordance with claim 20 wherein a primary key press is detected based upon the associated satellite force sensing pads having forces detected below a predetermined threshold when one of the first central switch and the second central switch is activated.

29. A multi-function key comprising:
a switch having a popple dome;
a force sensing area; and
an actuator positioned above the switch and at least a portion of the force sensing area,
wherein upon activation of the switch by the actuator, the force sensing area exhibits a force value that is used to determine a selected function from a plurality of functions.

30. The multi-function key in accordance with claim 29 wherein the plurality of functions includes character entry functions.

31. A method for operating a multi-function key comprising:
activating a switch having a popple dome;
measuring a first force value;
measuring a second force value; and
determining a selected function from a group of functions, which includes a primary function and a plurality of secondary functions, based on the first force value and the second force value.

32. A method according to claim 31, wherein the step of determining comprises:
selecting a primary function when a difference between the first force value and the second force value is below a predetermined threshold.

33. A method according to claim 31, wherein the step of determining comprises:
selecting a secondary function when a difference between the first force value and the second force value is above a predetermined threshold.

34. A method according to claim 31, wherein the step of determining comprises:
selecting a primary function when the first force value and the second force value are below a predetermined threshold.

35. A method according to claim 31, wherein the step of determining comprises:
selecting a secondary function when the first force value is above a predetermined threshold.

36. An electronic device with a key comprising:
a switch with a popple dome;
a first force sensing region, for acquiring a first force value;
a second force sensing region, for acquiring a second force value;
a third force sensing region, for acquiring a third force value;
a fourth force sensing region, for acquiring a fourth force value; and
a processor, coupled to the switch, the first force sensing region, the second force sensing region, the third force sensing region, and the fourth force sensing region, for determining a selected function for the key based upon the first force value, the second force value, the third force value, and the fourth force value, when the switch is activated.

* * * * *